March 21, 1933.  J. L. RUPP  1,902,267
STORAGE BATTERY SEPARATOR
Filed April 24, 1928

INVENTOR:
John L. Rupp,

Patented Mar. 21, 1933                                                                1,902,267

UNITED STATES PATENT OFFICE

JOHN L. RUPP, OF WILKINSBURG, PENNSYLVANIA, ASSIGNOR, BY MESNE ASSIGNMENTS, TO WUBCO BATTERY CORPORATION, OF NIAGARA FALLS, NEW YORK, A CORPORATION OF NEW YORK

STORAGE BATTERY SEPARATOR

Application filed April 24, 1928. Serial No. 272,502.

My invention relates to storage battery separators, and particularly to separators made of porous insulating material and adapted for use between plates of opposite polarity in storage batteries of the usual lead-sulphuric type.

One object of my invention is the provision of a porous separator which is protected on at least one side from the destructive action of nascent oxygen, but which permits free passage of the electrolyte through the separator.

I will describe one form of storage battery separator embodying my invention, and will then point out the novel features thereof in claims.

Figure 1:
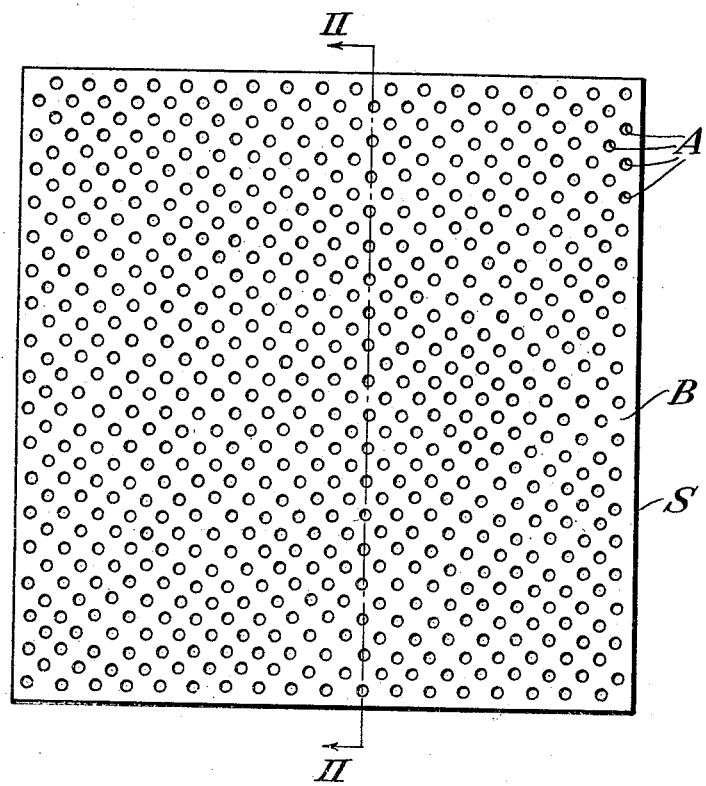
Figure 2:
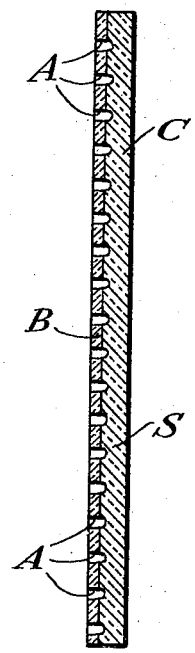

In the accompanying drawing, Fig. 1 is a view showing in front elevation one form of separator embodying my invention, and Fig. 2 is a sectional view on line II—II of Fig. 1, looking in the direction of the arrows.

Similar reference characters refer to similar parts in each of the views.

Referring to the drawing, the separator is designated in general by the reference character S, and in the form here shown, comprises a flat rectangular sheet C of suitable porous insulating material such for example, as wood pulp board.

Separators of the type described are intended to be inserted between adjacent positive and negative plates of a storage battery of the usual lead-sulphuric type. When a separator of this type is immersed in electrolyte, however, it swells, and its mechanical strength is then greatly reduced. Furthermore, when a battery containing a separator of this type is being charged, the nascent oxygen which is liberated at the positive plate, may attack the separator and destroy its insulating properties. To overcome these disadvantages, I coat the side of the separator which is to be placed adjacent the positive plate with a layer B of non-oxidizable acid resisting sizing material such as pyroxylin, or other suitable paint. This layer of sizing material prevents the nascent oxygen which is liberated from the positive plate from attacking the separator, and also adds mechanical strength to the separator. Most sizing materials, however, are impervious to the battery electrolyte, and to permit the passage of the electrolyte through the separator, I prefer to perforate the layer B of sizing material with a plurality of holes of comparatively small diameter, as shown at A. These holes may be conveniently made by running the separator through a perforating calendar, the roll of which is provided with piercing projections which pierce the layer of sizing material but do not pass entirely through the insulating sheet C.

Separators embodying my invention may be made of such thickness that the separators lack only a few thousandths of an inch from filling the space between the positive and negative plate of a storage battery. When the plates and separator are then immersed in the electrolyte and the separator swells, the separator completely fills the space between the plates, so that a comparatively rigid assembly results, and the active material of the plates is effectively held in place.

It will be apparent, therefore, that separators embodying my invention are comparatively strong and are not attacked by the nascent oxygen which is liberated at the positive plate of a storage battery on charge. Furthermore, separators embodying my invention are cheap to manufacture, and offer a comparatively low electrical resistance to the passage of current through the battery.

Although I have herein shown and described only one form of storage battery separator embodying my invention, it is understood that various changes and modifications may be made therein within the scope of the appended claims without departing from the spirit and scope of my invention.

Having thus described my invention, what I claim is:

1. A storage battery separator comprising a sheet of porous material having one side only thereof coated with sizing material forming a layer, said layer being perforated, and said perforations extending for a distance into but not completely through said porous material.

2. A storage battery separator comprising a sheet of wood pulp board having one side only coated with a perforated layer of non-oxidizable acid-resisting material, said perforations extending for a distance into but not completely through said board.

3. A storage battery separator comprising a porous member, perforated strengthening means secured to one side only thereof, said perforations extending for a distance into but not completely through said porous member.

In testimony whereof I affix my signature.

JOHN L. RUPP.